United States Patent
Moore et al.

(10) Patent No.: US 7,260,703 B1
(45) Date of Patent: *Aug. 21, 2007

(54) METHOD AND APPARATUS FOR I/O SCHEDULING

(75) Inventors: William H. Moore, Fremont, CA (US); Jeffrey S. Bonwick, Los Altos, CA (US); George R. Cameron, Santa Cruz, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 318 days.

This patent is subject to a terminal disclaimer.

(21) Appl. No.: 10/923,633

(22) Filed: Aug. 20, 2004

(51) Int. Cl.
G06F 9/26 (2006.01)
G06F 12/00 (2006.01)
G06F 9/46 (2006.01)

(52) U.S. Cl. .................... 711/203; 711/158; 718/103

(58) Field of Classification Search .............. 711/203, 711/158, 103
See application file for complete search history.

(56) References Cited

U.S. PATENT DOCUMENTS

| | | | | |
|---|---|---|---|---|
| 5,787,482 A | * | 7/1998 | Chen et al. ............... | 711/158 |
| 6,078,998 A | * | 6/2000 | Kamel et al. ............. | 711/151 |
| 6,721,789 B1 | * | 4/2004 | DeMoney .................. | 709/219 |
| 6,871,011 B1 | * | 3/2005 | Rahman et al. ........... | 386/125 |
| 7,100,074 B2 | * | 8/2006 | Watanabe et al. ......... | 714/9 |
| 2005/0044289 A1 | * | 2/2005 | Hendel et al. ............. | 710/33 |

OTHER PUBLICATIONS

Binary Search Trees and File Organization, J.Nievergelt; Computing Surveys, vol. 6, No. 3, Sep. 1974; pp. 203-204.*

* cited by examiner

*Primary Examiner*—Reginald Bragdon
*Assistant Examiner*—Aracelis Ruiz
(74) *Attorney, Agent, or Firm*—Osha Liang LLP

(57) ABSTRACT

In general, in one aspect, a method for storing data, including receiving a request to store data in a storage pool, determining a quantized deadline for the request, placing the request in an Input/Output (I/O) queue using the quantized deadline, placing a copy of the request in a logical block address (LBA) data structure using a LBA corresponding to the copy of the request, issuing the request to the storage pool using the I/O queue, and issuing an adjacent request to the storage pool using the LBA data structure, wherein the adjacent request is determined using the LBA of the copy of the request.

31 Claims, 6 Drawing Sheets

METHOD AND APPARATUS FOR I/O SCHEDULING

BACKGROUND

With modern disk drives, there is a large performance (approx. 100:1 ratio) difference between issuing Input/Output (I/O) requests in a sequential order (with respect to physical location) on disk versus issuing I/O requests in a random order. The large difference in performance is predominately the result of two sources of latency, namely seek latency and rotational delay. Seek latency corresponds to the time required for the disk drive to move a physical read/write head to the location on the disk (i.e., the area on a platter in the disk drive) and the time required to allow for fine-tuning the exact position of the read/write head (commonly referred to as "head settling"). Rotational delay occurs when the read/write head is in the proper position, but the disk drive must wait for the desired sector to rotate underneath the read/write head.

The aforementioned latencies are typically measured in milliseconds. This is a very large amount of time when compared to the time increment used to quantify processing power of processors (e.g., nanoseconds, etc.), and these delays tend to dictate the performance available to a file system given an underlying disk drive.

Modern disk drives have two common mechanisms that help to minimize the aforementioned sources of latency: tagged queuing and time-of-flight I/O scheduling. Tagged queuing allows the disk drive to accept multiple outstanding I/O requests that the disk drive may then service concurrently in any order that the disk drive chooses. Time-of-flight I/O scheduling allows the disk drive to use detailed knowledge about the disk drive geometry and other physical characteristics to potentially service other I/O requests while waiting out the rotational delay for a desired block.

For example, consider a disk drive (implementing the aforementioned mechanisms) has just completed servicing an I/O request for block 1000. The next I/O request that needs to be serviced is block 1500, which is located on the same track as block 1000, but 270 degrees of rotation away. While the disk drive is waiting for the disk to rotate around to block 1500, the disk drive analyzes the other outstanding I/O requests and determines that blocks 250 and 2750, which are located on adjacent tracks, may be serviced while still allowing time for the read/write head to seek back to the track for block 1500 in time to read the block 1500 as it passes under the read/write head.

SUMMARY

In general, in one aspect, a method for storing data, comprising receiving a request to store data in a storage pool, determining a quantized deadline for the request, placing the request in an Input/Output (I/O) queue using the quantized deadline, placing a copy of the request in a logical block address (LBA) data structure using a LBA corresponding to the copy of the request, issuing the request to the storage pool using the I/O queue, and issuing an adjacent request to the storage pool using the LBA data structure, wherein the adjacent request is determined using the LBA of the copy of the request.

In general, in one aspect, a system for storing data, comprising a storage pool configured to store data, an I/O queue configured to store a request to store data and an adjacent request to store data in the storage pool, a logical block address (LBA) data structure configured to store the request and the adjacent request, a file system configured to receive the request, determine the quantized deadline of the request, place the request in the I/O queue using a quantized deadline of the request and a logical block address of the request, place a copy of the request in the LBA data structure using an LBA of the copy of the request, and process the request and the adjacent request in the I/O queue.

In general, in one aspect, a computer system for storing a data, comprising a processor, a memory, a storage device, and software instructions stored in the memory for enabling the computer system under control of the processor, to receive a request to store data in a storage pool, determine a quantized deadline for the request place the request in an Input/Output (I/O) queue using the quantized deadline, place a copy of the request in a logical block address (LBA) data structure using a LBA corresponding to the copy of the request, issue the request to the storage pool using the I/O queue, and issue an adjacent request to the storage pool using the LBA data structure, wherein the adjacent request is determined using the LBA of the copy of the request.

In general, in one aspect, the invention relates to a computer readable medium comprising software instructions for enabling a computer system under the control of a processor, to receive a request to store data in a storage pool, determine a quantized deadline for the request, place the request in an Input/Output (I/O) queue using the quantized deadline, place a copy of the request in a logical block address (LBA) data structure using a LBA corresponding to the copy of the request, issue the request to the storage pool using the I/O queue, and issue an adjacent request to the storage pool using the LBA data structure, wherein the adjacent request is determined using the LBA of the copy of the request.

In general, in one aspect, the invention relates to a plurality of nodes, comprising a storage pool configured to store data, an I/O queue configured to store a request to store data and an adjacent request to store data in the storage pool, a logical block address (LBA) data structure configured to store the request and the adjacent request, and a file system configured to receive the request, determine the quantized deadline of the request, place the request in the I/O queue using a quantized deadline of the request and a logical block address of the request, place a copy of the request in the LBA data structure using an LBA of the copy of the request, and process the request and the adjacent request in the I/O queue, wherein the storage pool is located on at least one of the plurality of nodes, wherein the I/O queue is located on at least one of the plurality of nodes, wherein the file system is located on at least one of the plurality of nodes, wherein the LBA is located on at least one of the plurality of nodes.

Other aspects of the invention will be apparent from the following description and the appended claims.

DETAILED DESCRIPTION

Figure 1:
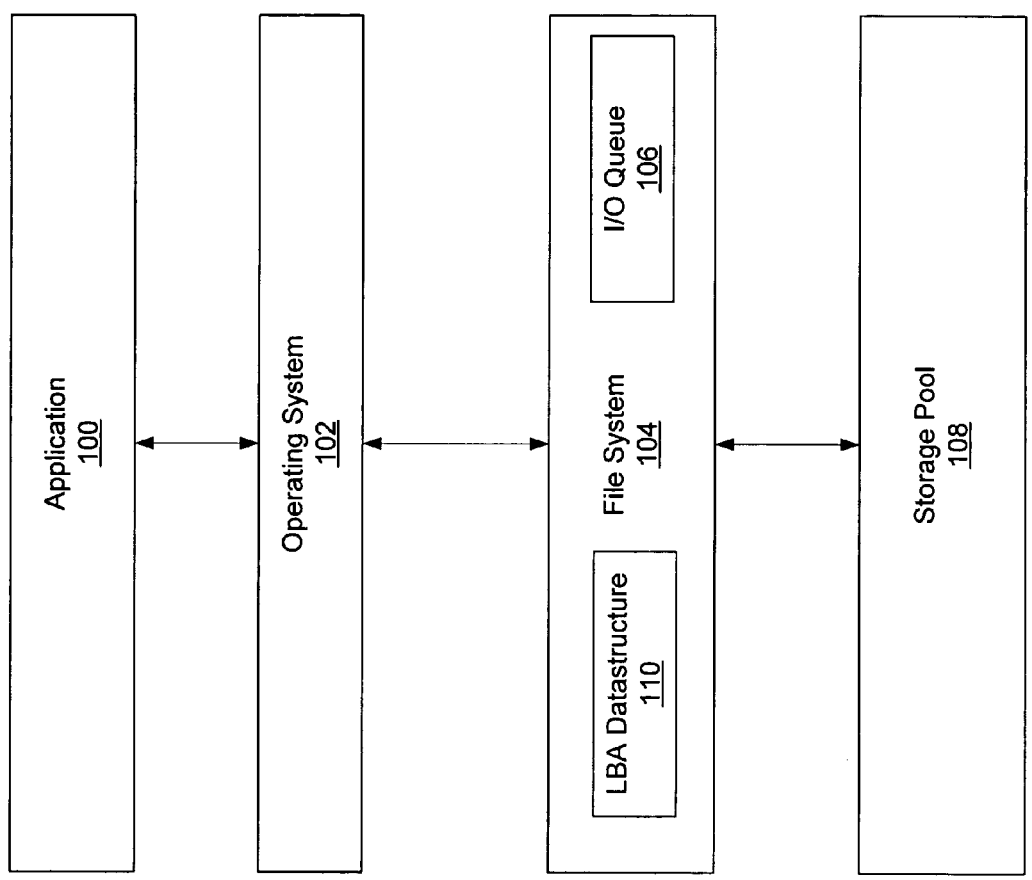
FIG. 1 shows a system architecture in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus for issuing an I/O request to a storage pool using a file system I/O queue and a logical block address (LBA) data structure. Further, embodiments of the invention provide a method and apparatus to schedule I/O requests at the file system level and at the same time leverage the tagged queuing and time-of-flight scheduling.

FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (108). Further, the file system (104) includes functionality to write the data into the storage pool (108).

In accordance with one embodiment of the invention, file system (104) may include an I/O management module (not shown), a compression module (not shown), an encryption module (not shown), a checksum module (not shown), and a metaslab allocator (not shown). Each of these aforementioned modules may be used by the file system (104) to read data from and/or write data to the storage pool (108). Each of the aforementioned modules is detailed below.

In one embodiment of the invention, the I/O management module (not shown) receives I/O requests and groups the I/O requests into transaction groups. The compression module (not shown) provides functionality to compress larger logical blocks into smaller segments, where a segment is a region of physical disk space. Further, in one embodiment of the invention, the encryption module (not shown) provides various data encryption algorithms. The data encryption algorithms may be used, for example, to prevent unauthorized access. In one embodiment of the invention, the checksum module (not shown) includes functionality to calculate a checksum for data and metadata within the storage pool. The checksum may be used, for example, to ensure data has not been corrupted. As discussed above, the file system (104) provides an interface to the storage pool (108) and manages allocation of storage space within the storage pool (108). More specifically, in one embodiment of the invention, the file system (104) uses the metaslab allocator (not shown) to manage the allocation of storage space in the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool.

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests for a particular physical disk within the storage pool (108). Alternatively, there may be one I/O queue (106) for the entire storage pool (108) (or for a portion of the storage pool (108)). In one embodiment of the invention, the file system (104) includes functionality to order the I/O requests in each of the I/O queues (e.g., I/O queue (106)). Further, the file system (104) may include functionality to order the I/O requests using a quantized deadline (described below in FIG. 4) associated with the I/O request and a logical block address (LBA) associated with the I/O request. The ordering of the I/O requests within the I/O queue (106) is described in FIG. 4 below.

In one embodiment of the invention, the file system (104) may also include an LBA data structure (110). The LBA data structure (110) includes functionality to store the I/O requests in LBA order. In one embodiment of the invention, the LBA data structure (110) is implemented as an AVL tree. Alternatively, the LBA data structure (110) may be implemented using any other suitable data structure (e.g., an array, a linked list, a hash table, etc.) Further, the file system (104) may include functionality to insert I/O requests into the LBA data structure (110) and functionality to retrieve I/O requests using LBAs.

Figure 2:
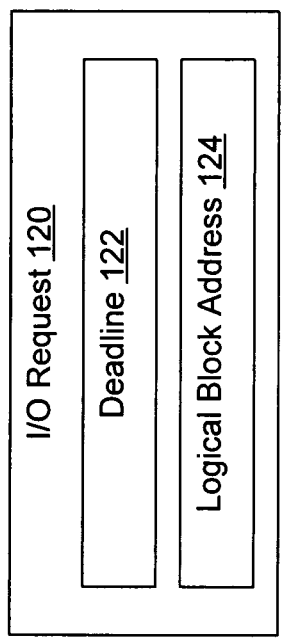
FIG. 2 shows an I/O request in accordance with one embodiment of the invention.

FIG. 2 shows an I/O request in accordance with one embodiment of the invention. The I/O request (120) includes a deadline (122) and a logical block address (LBA) (124). The deadline (122) may correspond to an actual deadline (e.g., a time by which a the I/O request must be issued, or a time frame during which the I/O request must be issued). Alternatively, the deadline (122) may correspond to priority such as: high priority (i.e., complete as soon as possible—may be used with I/O requests from real-time applications as well as synchronous requests), medium priority (i.e., complete soon, but not necessarily immediately—may be used with high priority asynchronous requests), or low priority (i.e., complete eventually—may be used with low priority asynchronous requests). In one embodiment of the invention, the LBA (124) is an n-bit value that maps to a specific location on the physical disk.

Figure 3:
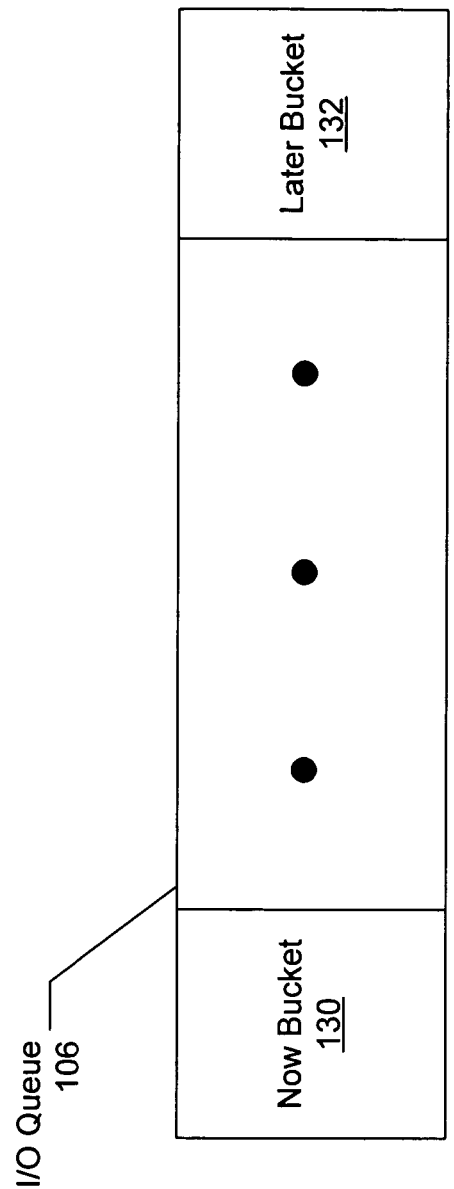
FIG. 3 shows an I/O queue in accordance with one embodiment of the invention.

FIG. 3 shows an I/O queue in accordance with one embodiment of the invention. The I/O queue (106) may include a number of buckets (e.g., a "now" bucket (130) and a "later" bucket (132)). In one embodiment of the invention each bucket (e.g., the "now" bucket (130) and the "later" bucket (132)) corresponds to a particular quantized deadline (described below in FIG. 4). Thus, all I/O requests with a given quantized deadline are stored in a particular bucket.

Further, the I/O requests within an individual bucket (e.g., the "now" bucket (130) and the "later" bucket (132)) are ordered with respect to LBA (124 in FIG. 2).

In one embodiment of the invention, the I/O queue (106) is implemented as an AVL tree. The AVL tree corresponds to a partially-balanced binary tree. In one embodiment of the invention, the nodes (i.e., the I/O requests) within the AVL tree are ordered using the quantized deadline and LBA corresponding to the nodes. If an AVL tree is used to implement the I/O queue (106), then the buckets (e.g., the "now" bucket (130), the "later" bucket (132)) correspond to portions of the AVL tree. In another embodiment of the invention, the I/O queue (106) is implemented as a hash table having hash buckets. Those skilled in the art will appreciate that the I/O queue (106) may be implemented in using any data structure that can maintain the order of the I/O requests.

Figure 4:
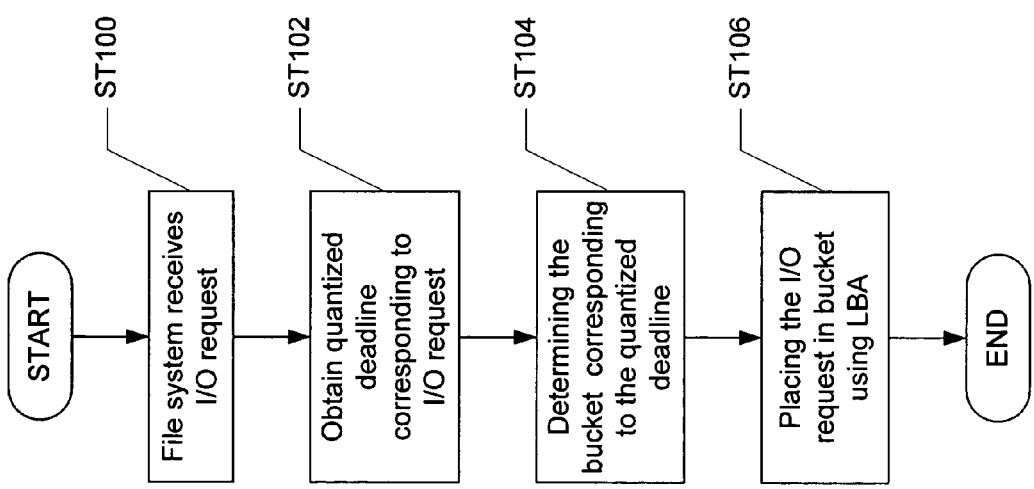
FIGS. 4, 5, and 6 show flowcharts in accordance with one embodiment of the invention.
Figure 5:
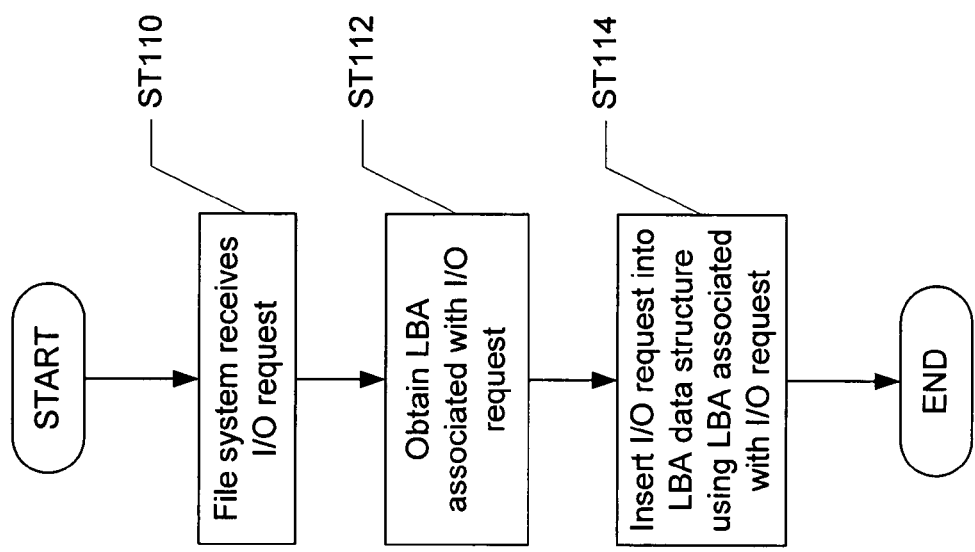
Figure 6:
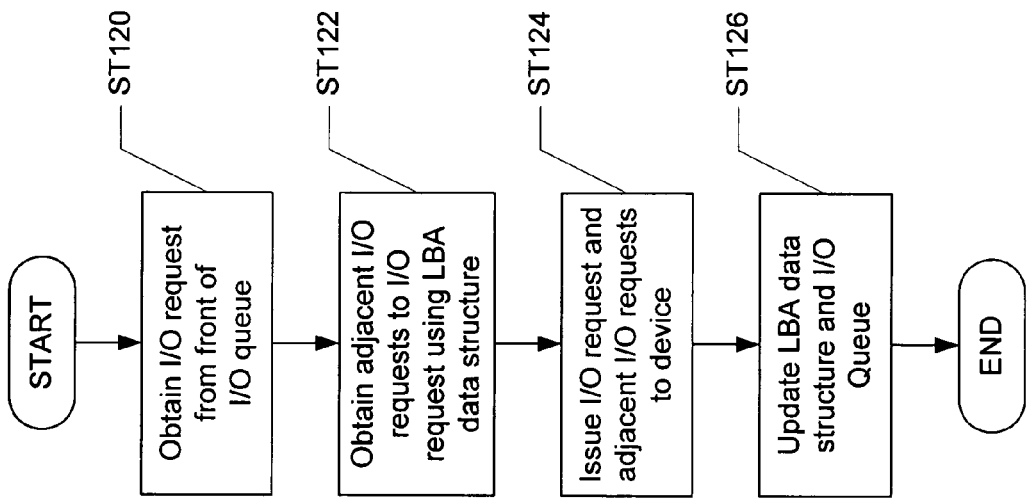

FIGS. 4, 5, and 6 show flowcharts in accordance with one embodiment of the invention. FIG. 4 shows a flowchart for placing an I/O request in an I/O queue in accordance with one embodiment of the invention. Initially, an I/O request is received by the file system (ST100). A quantized deadline is subsequently determined for the I/O request (ST102). In one embodiment of the invention, a quantized deadline corresponds to a period of time when a particular request is to be performed. The quantized deadline is used to coarsely order the I/O request in the I/O queue. In one embodiment of the invention, the quantized deadlines are set in millisecond intervals.

For example, consider the following quantized deadlines: now (0-99 ms), soon (100-199 ms), and later (199 ms+). Thus, when an I/O request having a deadline of 75 ms is received, then the quantized deadline for the I/O request is considered "now". Note that the quantized deadlines may be set using any magnitude (e.g., seconds, millisecond, nanoseconds, etc.) and any duration of time interval. Further, the quantized deadlines may be identified using any type of label. In one embodiment of the invention, the intervals of the quantized deadlines may be adjusted such that the buckets corresponding to the quantized deadline contain only (or slightly more than) the number of I/O requests that may be processed prior to the I/O requests in the bucket expiring.

Once the quantized deadline for the I/O request is determined, the bucket correspond to the quantized deadline is determined (ST104). In one embodiment of the invention, if the I/O queue is implemented as an AVL tree, then determining the bucket corresponding to the quantized deadline includes identifying the portion of the AVL tree that corresponds to the bucket. Alternatively, if the I/O queue is implemented as a hash table having hash buckets, then determining the bucket corresponding to the quantized deadline includes identifying the appropriate hash bucket.

Once the corresponding bucket is determined, the I/O request is placed in the bucket in an order determined by the LBA of the I/O request (ST106). In one embodiment of the invention, the LBA of the I/O request that is being inserted into the I/O queue is compared with the LBAs of the I/O requests already in the bucket, and then inserted into the appropriate location in the bucket. The insertion of the I/O request into the I/O queue includes inserting the I/O request into the appropriate location in the data structure implementing the I/O queue (e.g., a linked list, an array, an AVL tree, etc).

FIG. 5 shows a flowchart for placing an I/O request in an LBA data structure. Initially, the file system receives the I/O request (ST110). The LBA of the request is subsequently obtained (ST112). The file system (or a related process) subsequently inserts the I/O request into the LBA data structure in the appropriate location using the LBA of the I/O request.

Those skilled in the art will appreciate that the methods shown in FIGS. 4 and 5 are both performed every time an I/O request is received by the file system. Further, the method shown in FIGS. 4 and 5 may be performed sequentially or concurrently when the I/O request is received. Upon the completion of the methods shown in FIGS. 4 and 5, a copy of the I/O request is placed in both the I/O queue and the LBA data structure.

FIG. 6 shows a flowchart for processing the I/O request in the I/O queue in accordance with one embodiment of the invention. Initially, the highest priority I/O request is obtained from the I/O queue (ST120). In one embodiment of the invention, the highest priority request corresponds to the I/O request in the "now" bucket with the highest priority based on LBA. If the I/O queue is implemented as an AVL tree, then the highest priority I/O request is the I/O request at the left-most leaf of the AVL tree.

Once the highest priority I/O request is obtained, the LBA of the high priority request is used to obtain one or more adjacent I/O requests (ST122). In one embodiment of the invention, the adjacent I/O requests correspond I/O requests that may be serviced (without any delay or minimal delay) while the disk is rotating from the current location to the location necessary to process the highest priority I/O request. For example, if the disk has to rotate 180 degrees from its current location to service the highest priority I/O request, then the file system may issue additional I/O requests that are in the path between the current location of the read/write head and the location of the read/write head required to service the highest priority I/O request. Those skilled in the art will appreciate that an I/O request may be considered on the path even if the I/O request requires the read/write head to switch tracks in order to service the request.

In one embodiment of the invention, adjacent I/O requests may be determined by obtaining I/O requests that have LBAs within a few megabytes (e.g., one megabyte) of the LBA of the highest priority I/O request. The adjacent I/O requests are obtained using the LBA data structure (in which I/O requests are ordered with respect to LBA) and the LBA of the highest priority I/O request. In one embodiment of the invention, the LBA interval to find adjacent I/O requests is set to an interval that allows the disk to leverage time-of-flight scheduling.

Once the highest priority I/O request and the adjacent I/O requests have been determined, the highest priority I/O request and the adjacent I/O requests are issued to the appropriate storage device (e.g., a physical disk) (ST124). Once the highest priority I/O request and the adjacent I/O requests has been issued, the highest priority I/O request and any adjacent I/O requests that were issued are removed from the I/O queue and the LBA data structure, and the I/O queue and the LBA data structure are updated (ST126). In one embodiment of the invention, the I/O queue is updated by moving one or more I/O requests from a bucket at the back of the I/O queue to a bucket closer to the front of the I/O queue (e.g., from the "later" bucket to the "now" bucket). Alternatively, if the I/O queue is implemented as an AVL tree, then I/O queue is updated by rebalancing the AVL tree. The LBA data structure is updated in a similar manner.

Those skilled in the art will appreciate that methods described in FIGS. 4, 5, and 6 may occur concurrently within the system. As such, when new I/O requests are received by the file system, the file system places the I/O request in the I/O queue and the LBA data structure, thereby reordering the I/O queue and the LBA data structure. As noted above, the intervals of the quantized deadlines may be adjusted such that the buckets corresponding to the quantized deadline contain only (or slightly more than) the number of I/O requests that may be processed prior to the expiration of the deadlines of the I/O requests in the bucket.

However, in some situations, all of the I/O requests in the bucket may not be able to be processed prior to the expiration of the deadlines of the I/O requests. In such situations, in order to ensure that the I/O requests with expired deadlines are not preempted by other newly arriving high priority I/O requests, the unprocessed I/O requests (typically unprocessed I/O requests from the "now" bucket) are placed in an "immediate" bucket. The "immediate" bucket (not shown in FIG. 3) corresponds to a bucket that has a higher priority than the "now" bucket. Further, an I/O request may not be initially placed in the "immediate" bucket, rather, the I/O request may only move to the "immediate" bucket if the I/O request was previously in the "now" bucket and unprocessed while the I/O request's deadline expired. Further, when new I/O requests are received by the file system, the new I/O requests may only be placed in buckets with less priority than the "immediate" bucket (i.e., in the "now" bucket, the "later" bucket, etc.). In this manner, the I/O requests with expired deadlines are processed.

Those skilled in the art will appreciate that while the aforementioned discussion of embodiments of the invention described a file system that functions without a volume manager, the invention may be implemented on a system architecture with a volume manager. Those skilled in the art will appreciate that while the above discussion of the embodiments of the invention used LBA to order the I/O requests within the corresponding buckets, the I/O request may be ordered using any criteria that minimizes latency or satisfies other performance requirement. The criteria may include information about disk geometry, other characteristics of the disk, etc.

Figure 7:
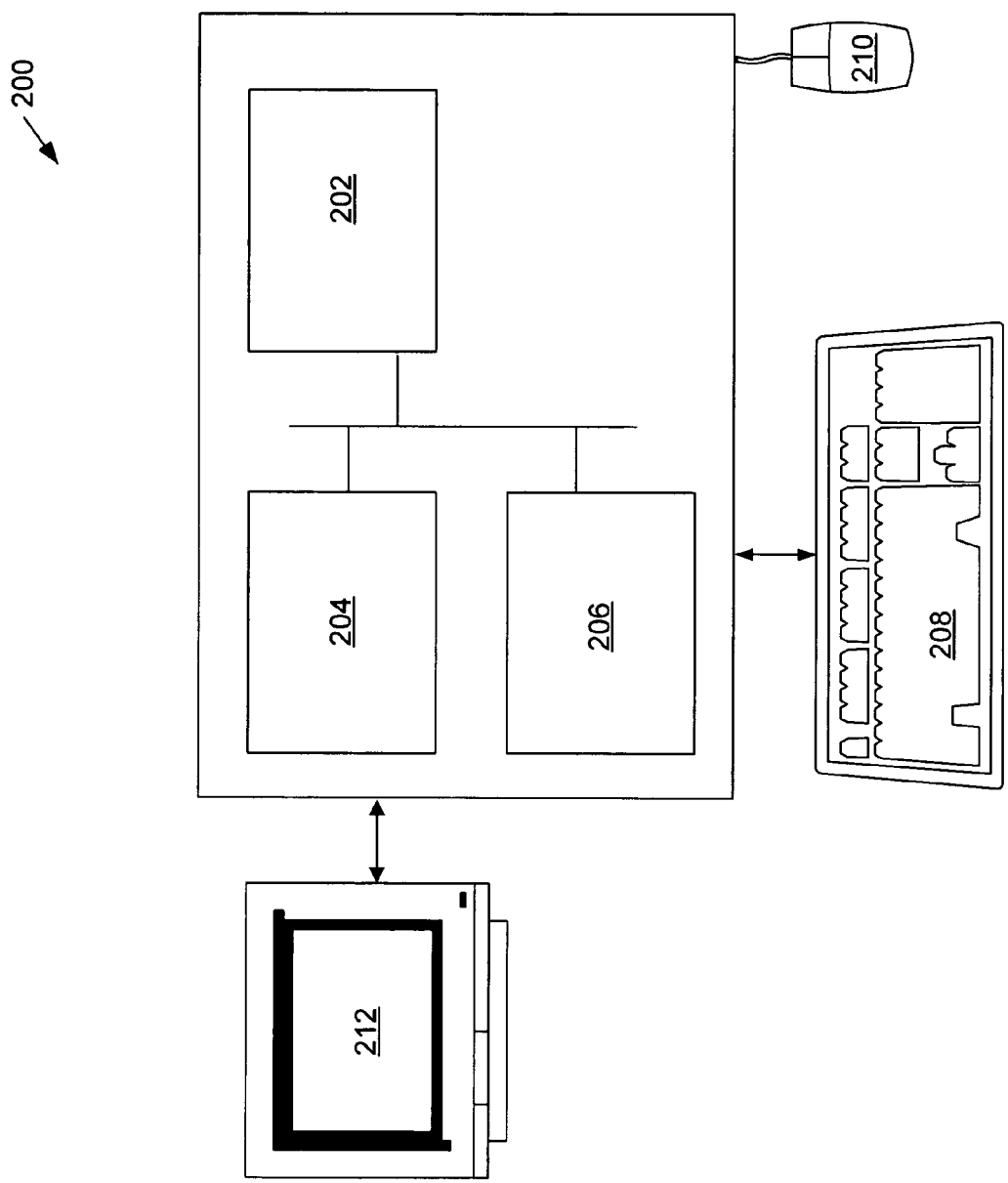
FIG. 7 shows a computer system in accordance with one embodiment of the invention.

The invention may be implemented on virtually any type of computer regardless of the platform being used. For example, as shown in FIG. 7, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., file system, the storage pool, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
   receiving a request to store data at a first logical block address (LBA) in a storage pool;
   determining a quantized deadline for the request;
   placing the request in an Input/Output (I/O) queue using the quantized deadline;
   placing a copy of the request in an LBA data structure using the first LBA;
   issuing the request to the storage pool using the I/O queue; and
   issuing an adjacent request to the storage pool using the LBA data structure, wherein the adjacent request is determined using the first LBA.

2. The method of claim 1, further comprising:
   updating the I/O queue and the LBA data structure after the request and the adjacent request have been issued to the storage pool.

3. The method of claim 2, wherein updating the I/O queue comprises removing the request and the adjacent request from the I/O queue.

4. The method of claim 2, wherein updating the LBA data structure comprises removing the request and the adjacent request from the LBA data structure.

5. The method of claim 1, wherein the I/O queue comprises a plurality of buckets.

6. The method of claim 5, wherein the placing the request in the I/O queue comprises placing the request in one of the plurality of buckets corresponding to the quantized deadline.

7. The method of claim 6, wherein the request is ordered in the one of the plurality of buckets using the first LBA.

8. The method of claim 1, wherein the adjacent request comprises a second LBA within one megabyte of the first LBA.

9. The method of claim 1, wherein the I/O queue is implemented as an AVL tree.

10. The method of claim 9, wherein placing the request in the I/O queue comprises placing the request in the AVL tree with respect to the quantized deadline and the first LBA.

11. The method of claim 10, further comprising:
    processing a highest priority request in the AVL tree; and
    re-balancing the AVL tree after the highest priority request has been processed.

12. The method of claim 1, wherein the I/O queue is associated with a file system.

13. The method of claim 1, wherein the LBA data structure is implemented as an AVL tree.

14. A system for storing data, comprising:
    a storage pool configured to store data;
    an I/O queue configured to store a request to store data at a first logical block address (LBA) in the storage pool and an adjacent request to store data in the storage pool;
    an LBA data structure configured to store the request and the adjacent request;
    a file system configured to:
       receive the request,
       determine a quantized deadline for the request,
       place the request in the I/O queue using the quantized deadline and the first LBA, place a copy of the request in the LBA data structure using the first LBA, issue the request to the storage pool using the I/O queue, and issue the adjacent request to the storage pool using the LBA data structure, wherein the adjacent request is determined using the first LBA.

15. The system of claim 14, wherein the I/O queue is located in the file system.

16. The system of claim 14, further comprising:
an application configured to issue the request and the adjacent request to the file system, wherein the adjacent request comprises a second LBA within one megabyte of the first LBA.

17. The system of claim 4, wherein the file system is further configured to update the I/O queue and the LBA data structure after the request and the adjacent request have been issued to the storage pool.

18. The system of claim 17, wherein updating the I/O queue comprises removing the request and the adjacent request from the I/O queue.

19. The system of claim 17, wherein updating the LBA data structure comprises removing the request and the adjacent request from the LBA data structure.

20. The system of claim 14, wherein the I/O queue comprises a plurality of buckets.

21. The system method of claim 20, wherein the file system is further configured to place the request in one of the plurality of buckets corresponding to the quantized deadline.

22. The system of claim 21, wherein the request is ordered in the one of the plurality of buckets using the request the first LBA.

23. The system of claim 20, wherein the plurality of buckets comprises a "now" bucket and a "later" bucket.

24. The system of claim 23, wherein the file system is further configured to:
process the "now" bucket; and
update the I/O queue after the "now" bucket has been processed.

25. The system of claim 24, wherein processing the "now" bucket comprises issuing all requests in the "now" bucket to the storage pool.

26. The system of claim 14, wherein the I/O queue is an AVL tree.

27. The system of claim 26, wherein placing the request in the I/O queue comprises placing the request in the AVL tree with respect to the quantized deadline and the first LBA.

28. The system of claim 27, wherein the file system is further configured to:
process a highest priority request in the AVL tree; and
re-balancing re-balance the AVL after the highest priority request has been processed.

29. A computer system for storing data, comprising:
a processor;
a memory;
a storage device; and
software instructions stored in the memory for enabling the computer system, under control of the processor, to:

receive a request to store data at a logical block address (LBA) in a storage pool;

determine a quantized deadline for the request;

place the request in an Input/Output (I/O) queue using the quantized deadline;

place a copy of the request in an LBA data structure using the LBA;

issue the request to the storage pool using the I/O queue; and issue an adjacent request to the storage pool using the LBA data structure, wherein the adjacent request is determined using the LBA.

30. A computer readable medium comprising software instructions for enabling a computer system, under the control of a processor, to:

receive a request to store data at a logical block address (LBA) in a storage pool;

determine a quantized deadline for the request;

place the request in an Input/Output (I/O) queue using the quantized deadline;

place a copy of the request in an LBA data structure using the LBA;

issue the request to the storage pool using the I/O queue; and issue an adjacent request to the storage pool using the LBA data structure, wherein the adjacent request is determined using the LBA.

31. A plurality of nodes, comprising:
a storage pool configured to store data;
an I/O queue configured to store a request to store data at a logical block address (LBA) in the storage pool and an adjacent request to store data in the storage pool;
an LBA data structure configured to store the request and the adjacent request; and
a file system configured to:
receive the request,
determine a quantized deadline for the request,
place the request in the I/O queue using the quantized deadline and the LBA,
place a copy of the request in the LBA data structure using the LBA, copy of the request, and,
issue the request to the storage pool using the I/O queue, and
issue the adjacent request to the storage pool using the LBA data structure, wherein the adjacent request is determined using the LBA,
wherein the storage pool is located on at least one of the plurality of nodes,
wherein the I/O queue is located on at least one of the plurality of nodes,
wherein the file system is located on at least one of the plurality of nodes,
wherein the LBA is located on at least one of the plurality of nodes.

* * * * *